United States Patent
Yamada et al.

(10) Patent No.: US 6,798,538 B1
(45) Date of Patent: Sep. 28, 2004

(54) HALFTONING AT MULTIPLE DIFFERENT RESOLUTIONS

(75) Inventors: Akitoshi Yamada, Yokohama (JP);
Masashi Kamada, Irvine, CA (US);
Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 09/658,613

(22) Filed: Sep. 8, 2000

(51) Int. Cl.[7] .............................. H04N 1/52; H04N 1/56
(52) U.S. Cl. ......................... 358/1.9; 258/2.1; 258/534
(58) Field of Search ....................... 358/1.9, 2.1, 3.06, 358/3.24, 534, 536, 535, 502

(56) References Cited

U.S. PATENT DOCUMENTS

| | | | |
|---|---|---|---|
| 5,424,854 A | * | 6/1995 | Hashimoto ................. 358/3.17 |
| 5,719,689 A | * | 2/1998 | Terada ........................ 358/529 |
| 5,739,828 A | | 4/1998 | Moriyama et al. ............. 347/9 |
| 5,795,082 A | | 8/1998 | Shimada et al. ........ 400/120.09 |
| 5,841,458 A | | 11/1998 | Kroon ........................ 347/131 |
| 5,900,891 A | | 5/1999 | Shimoda ...................... 347/43 |
| 5,949,453 A | * | 9/1999 | Harris et al. ................. 347/43 |
| 6,007,174 A | | 12/1999 | Hirabayashi et al. ......... 347/14 |

* cited by examiner

*Primary Examiner*—Scott Rogers
(74) *Attorney, Agent, or Firm*—Fitzpatrick, Cella, Harper & Scinto

(57) ABSTRACT

Multi-resolution halftoning to process image data by determining whether the image data corresponds to black image data or color image data, performing a halftoning process of a first resolution on the black image data, performing a halftoning process of a second resolution on the color image data, and performing a smoothing process on the black image data. The first resolution may be a low resolution and the second resolution may be a high resolution and the black image data may be expanded into high resolution data. Image data subjected to multi-resolution halftoning may be printed by a print head with black nozzles having a faster printing speed than color nozzles.

19 Claims, 12 Drawing Sheets

HALFTONING AT MULTIPLE DIFFERENT RESOLUTIONS

BACKGROUND OF THE INVENTION

1. Field of the Invention

The present invention relates to image processing and in particular to halftoning of image data. More specifically, the present invention relates to multi-resolution halftoning of image data by performing a low resolution halftoning process for black image data and a high resolution halftoning process for color image data.

2. Description of the Related Art

Image processing to print images from a computer generally includes processes by a print driver on a host computer side and processes by a print control board on a printer side. The print driver includes processes for rasterization, halftoning, and data compression and transfer to the printer. The print control board includes processes for data expansion (sometimes including indexing) and smoothing. Because of processor limitations (speed, memory, etc.), it has been challenging to obtain a good balance between each of these processes to obtain good printing performance (image processing speed) and a good quality image. More particularly, it has been difficult to achieve high performance printing with good smoothness in gradation areas as well as good text quality.

Rasterization generally refers to a process of a graphics device interface converting graphics image data into rasterized image data to be utilized in printing the displayed image. Conventionally, rasterization is performed by processing an image at display resolution (typically 72 dpi (dots per inch)) to extract red (R), green (G) and blue (B) values for each pixel and to render the data into a rasterized image at print resolution which may be either low resolution (e.g. 300 dpi) or high resolution (e.g. 600 dpi). The rasterization process processes both black image data and color image data with the same rasterization process, i.e. either a low resolution rasterization process for both black image data and color image data or a high resolution rasterization process for both. Performing a high resolution rasterization process provides for a higher quality image. However, the high resolution rasterization process significantly increases processing time, as well as processing time for downstream processes, thereby providing for a lower performance. Thus, to provide for increased performance, a low resolution rasterization process is preferred.

The RGB values obtained in the rasterization process are processed to obtain continuous tone values of cyan (C), magenta (M), yellow (Y) and black (K), which are values associated with printers. In halftoning, the continuous tone CMYK values for the image data are subjected to a process that determines whether or not an ink droplet is to be ejected at a particular pixel location. The halftoning process generally comprises comparing an input image data value to a threshold value and printing a dot if the value is above the threshold or not printing a dot if the value is below the threshold. This type of halftoning is commonly referred to as bi-level halftoning.

Another type of halftoning process is multi-level halftoning. Multi-level halftoning is similar to bi-level halftoning, except that additional threshold comparison tests are performed. For instance, input image values may range from 0 to 255. The input value may be compared to a threshold of 128 (mid-point of the range). If the input value is above 128, then a second threshold test may be performed for a range of 128 to 255 with a threshold of 192 (mid-point of the second range). Further threshold tests may continue to be performed until the difference between the image data value and the threshold value falls within a desired limit. Of course, additional iterations could also be performed in the same manner if the initial threshold test determines that the input value is below the initial threshold. Multi-level halftoning provides for increased image quality over bi-level halftoning, but increases processing time due to the multiple iterations.

Halftoning processes may also include an error diffusion process. The error diffusion process somewhat compensates for errors that result from the threshold comparison between the input image value and the threshold value. The compensation is provided by a process that diffuses the errors to surrounding pixels of the subject pixel.

Conventionally, the halftoning process is performed in either high resolution or in low resolution, the former resulting in a higher quality image and the latter resulting for a lower quality image. Whether the halftoning process is a high resolution process or a low resolution process is generally determined by the resolution of the image data input to the halftoning process. Thus, if the image is rasterized in low resolution and the low resolution data is subjected to halftoning, the halftoning process is low resolution. Similarly, if the image is rasterized in high resolution and the high resolution data is subjected to halftoning, the halftoning process is high resolution. Of course, a process to expand low resolution rasterized data into high resolution data prior to being subjected to the halftoning process could also be performed, thereby resulting in high resolution halftoning.

Conventionally, a single halftoning process is generally performed on the image data. That is, both black image data and color image data are subjected to the same halftoning process. Therefore, if a high resolution image is desired, high resolution halftoning is performed and both the black image data and the color image data are subjected to the same high resolution halftoning process. However, high resolution halftoning increases the processing time, thereby resulting in lower performance.

As a result of the rasterization and halftoning processes, low resolution rasterization and low resolution halftoning increase performance but result in a low quality image. Conversely, high resolution rasterization and high resolution halftoning result in a good quality image, but increased processing time, i.e. low performance.

As previously stated, it is possible to perform a low resolution rasterization process and expand the low resolution image data into high resolution image data prior to being subjected to the halftoning process. This combination reduces the processing time somewhat, as compared to a high resolution rasterization/high resolution halftoning combination and generally provides for good smoothness in gradation areas, but text quality remains low.

It has also been considered to utilize low resolution rasterization and low resolution multi-level halftoning, combined with indexing and smoothing processes performed in the printer. With this process, the print driver performs low resolution rasterization and low resolution halftoning, and the low resolution data is transferred to the printer, together with index pattern and key information. The index pattern and key are utilized by the printer to expand the low resolution image data into high resolution data. This combination helps to increase performance by allowing less data (low resolution data) to be transmitted to the printer and also provides better smoothness in gradation areas than bi-level halftoning. However, this process results in a lower quality image than would otherwise result from performing high resolution halftoning.

It has further been considered to combine low resolution rasterization and low resolution halftoning, coupled with expansion of the low resolution data to high resolution data (without an index pattern and key) and smoothing in the printer control board. This combination increases performance by providing for a smaller data transfer size and results in good quality text and solid images, but details in the gradation areas are lost.

As can readily be seen from the foregoing, it has been difficult to obtain an image process that provides a good balance of high performance coupled with good quality text and good details in gradation areas.

SUMMARY OF THE INVENTION

The present invention addresses the foregoing by performing multi-resolution halftoning in which black image data and color image data are halftoned with different halftoning processes, each corresponding to different resolutions, and performing image smoothing in the printer for black image data so as to obtain high quality for both text and gradation areas, together with good performance.

Accordingly, in one aspect the invention is image processing by rasterization of image data, determining whether the image data corresponds to black image data or color image data, performing a halftoning process of a first resolution on the black image data, and performing a halftoning process of a second and higher resolution on the color image data. The first resolution may be a low resolution and the second resolution may be a high resolution. The halftoned black and color image data is transferred to a printing device, together with a command for the printing device to perform smoothing-processing on the black image data, whereby the printing device outputs an image. The invention may also provide for expanding the black image data to high resolution data in the printing device.

As a result of the foregoing, since the halftoning process is performed separately for black image data and color image data at different resolutions, a higher performance may be achieved for processing of black image data and a high quality image may be achieved for processing of color image data. This is in contrast to conventional methods in which, in order to achieve a high quality image, a high resolution halftoning process is performed on both color and black image data, thereby increasing the processing time. Additionally, performing a smoothing process on the black image data provides for good quality text and good details in gradation areas. Further image quality for the black text can be achieved by the expansion process. Therefore, the problem of obtaining a good balance between performance, text and color image quality and good details in gradation areas may be achieved by the present invention.

The invention may also provide for processing image data according to the foregoing and printing the data with a print head having a faster printing speed for printing black image data than for printing color image data. The faster printing speed of the black image data provides for even further advantages in performance.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
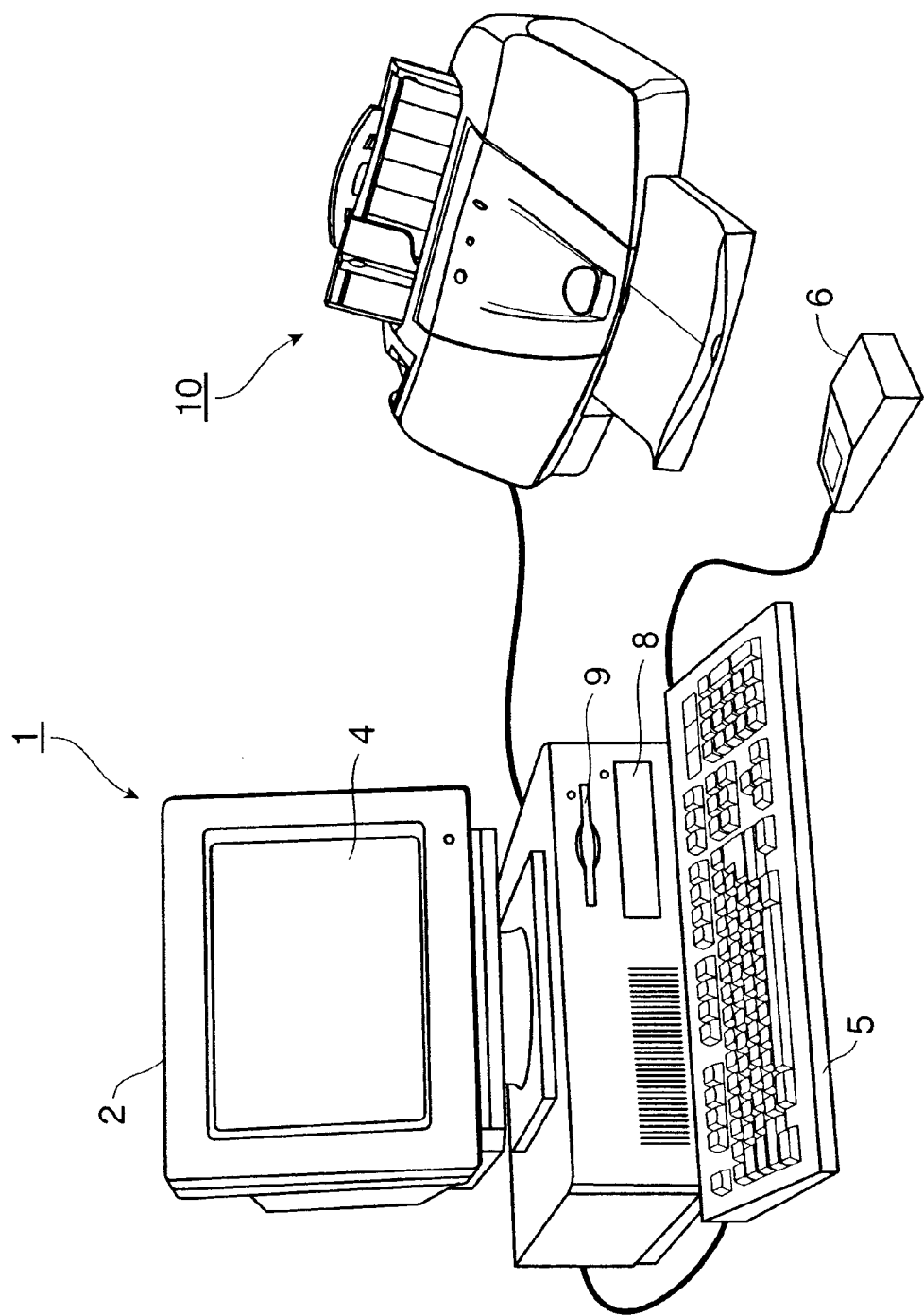
FIG. 1 shows a perspective view of computing equipment used in connection with the printer of the present invention.

FIG. 1 is a view showing the outward appearance of computing equipment used in connection with the invention described herein. Computing equipment 1 includes host processor 2. Host processor 2 comprises a personal computer (hereinafter "PC"), preferably an IBM PC-compatible computer having a windowing environment, such as Microsoft® Windows95. Provided with computing equipment 1 are display 4 comprising a color monitor or the like, keyboard 5 for entering text data and user commands, and pointing device 6. Pointing device 6 preferably comprises a mouse for pointing and for manipulating objects displayed on display 4.

Computing equipment 1 includes a computer-readable memory medium, such as fixed computer disk 8, and floppy disk interface 9. Floppy disk interface 9 provides a means whereby computing equipment 1 can access information, such as data, application programs, etc., stored on floppy disks. A similar CD-ROM interface (not shown) may be provided with computing equipment 1, through which computing equipment 1 can access information stored on CD-ROMs.

Disk 8 stores, among other things, application programs by which host processor 2 generates files, manipulates and stores those files on disk 8, presents data in those files to an operator via display 4, and prints data in those files via printer 10. Disk 8 also stores an operating system which, as noted above, is preferably a windowing operating system such as Windows95. Device drivers are also stored in disk 8. At least one of the device drivers comprises a printer driver which provides a software interface to firmware in printer 10. Data exchange between host processor 2 and printer 10 is described in more detail below.

Figure 2:
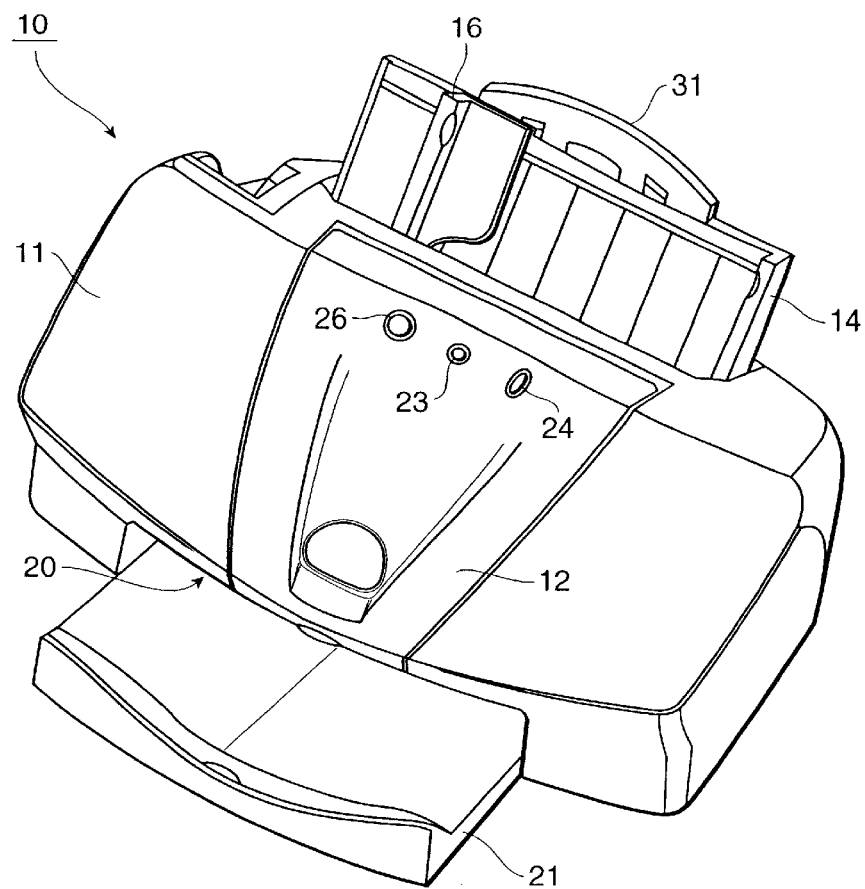
FIG. 2 is a front perspective view of the printer shown in FIG. 1.
Figure 3:
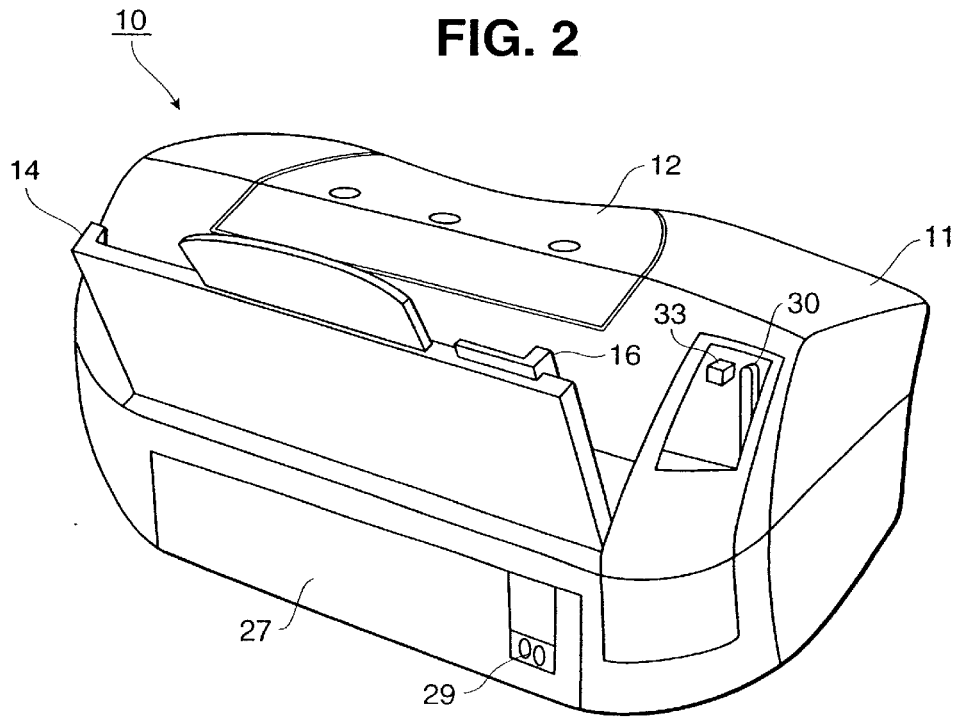
FIG. 3 is a back perspective view of the printer shown in FIG. 1.

FIGS. 2 and 3 show perspective front and back views, respectively, of printer 10. As shown in FIGS. 2 and 3, printer 10 includes housing 11, access door 12, automatic feeder 14, automatic feed adjuster 16, media eject port 20, ejection tray 21, power source 27, power cord connector 29, parallel port connector 30 and universal serial bus (USB) connector 33.

Housing 11 houses the internal workings of printer 10, including a print engine which controls the printing operations to print images onto recording media. Included on housing 11 is access door 12. Access door 12 is manually openable and closeable so as to permit a user to access the internal workings of printer 10 and, in particular, to access ink tanks installed in printer 10 so as to allow the user to change or replace the ink tanks as needed. Access door 12 also includes indicator light 23, power on/off button 26 and resume button 24. Indicator light 23 may be an LED that lights up to provide an indication of the status of the printer, i.e. powered on, a print operation in process (blinking), or a failure indication. Power on/off button 26 may be utilized to turn the printer on and off and resume button 24 may be utilized to reset an operation of the printer.

As shown in FIGS. 2 and 3, automatic feeder 14 is also included on housing 11 of printer 10. Automatic feeder 14 defines a media feed portion of printer 10. That is, automatic feeder 14 stores recording media onto which printer 10 prints images. In this regard, printer 10 is able to print images on a variety of types of recording media. These types include, but are not limited to, plain paper, high resolution paper, transparencies, glossy paper, glossy film, back print film, fabric sheets, T-shirt transfers, bubble jet paper, greeting cards, brochure paper, banner paper, thick paper, etc.

During printing, individual sheets which are stacked within automatic feeder 14 are fed from automatic feeder 14 through printer 10. Automatic feeder 14 includes automatic feed adjuster 16. Automatic feed adjuster 16 is laterally movable to accommodate different media sizes within automatic feeder 14. These sizes include, but are not limited to, letter, legal, A4, B5 and envelope. Custom-sized recording media can also be used with printer 10. Automatic feeder 14 also includes backing 31, which is extendible to support recording media held in automatic feeder 14. When not in use, backing 31 is stored within a slot in automatic feeder 14, as shown in FIG. 2.

As noted above, media are fed through printer 10 and ejected from eject port 20 into ejection tray 21. Ejection tray 21 extends outwardly from housing 11 as shown in FIG. 2 and provides a receptacle for the recording media upon ejection for printer 10. When not in use, ejection tray 21 may be stored within printer 10.

Power cord connector 29 is utilized to connect printer 10 to an external AC power source. Power supply 27 is used to convert AC power from the external power source, and to supply the converted power to printer 10. Parallel port 30 connects printer 10 to host processor 2. Parallel port 30 preferably comprises an IEEE-1284 bi-directional port, over which data and commands are transmitted between printer 10 and host processor 2. Alternatively, data and commands can be transmitted to printer 10 through USB port 33.

Figure 4:
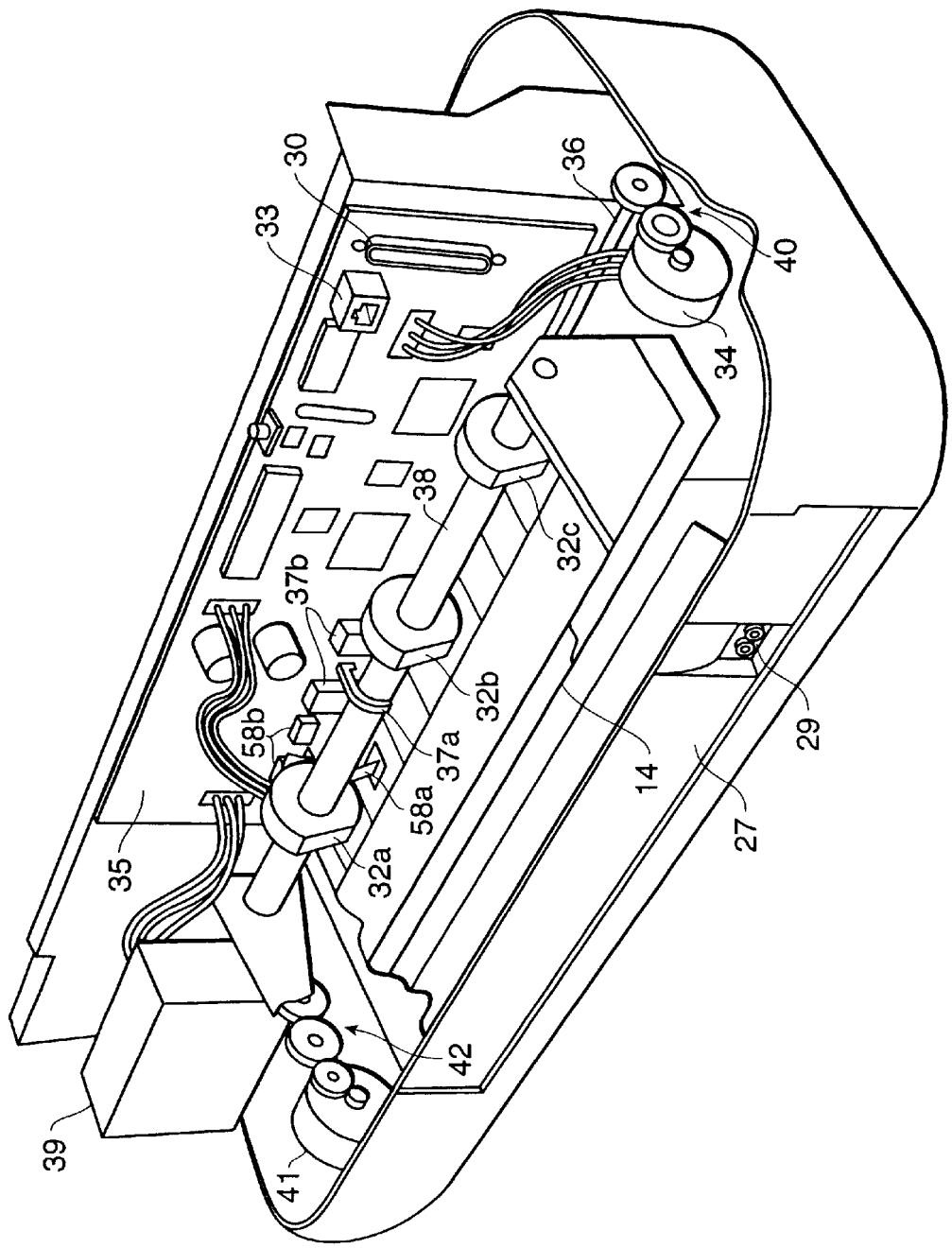
FIG. 4 is a back, cut-away perspective view of the printer shown in FIG. 1.
Figure 5:
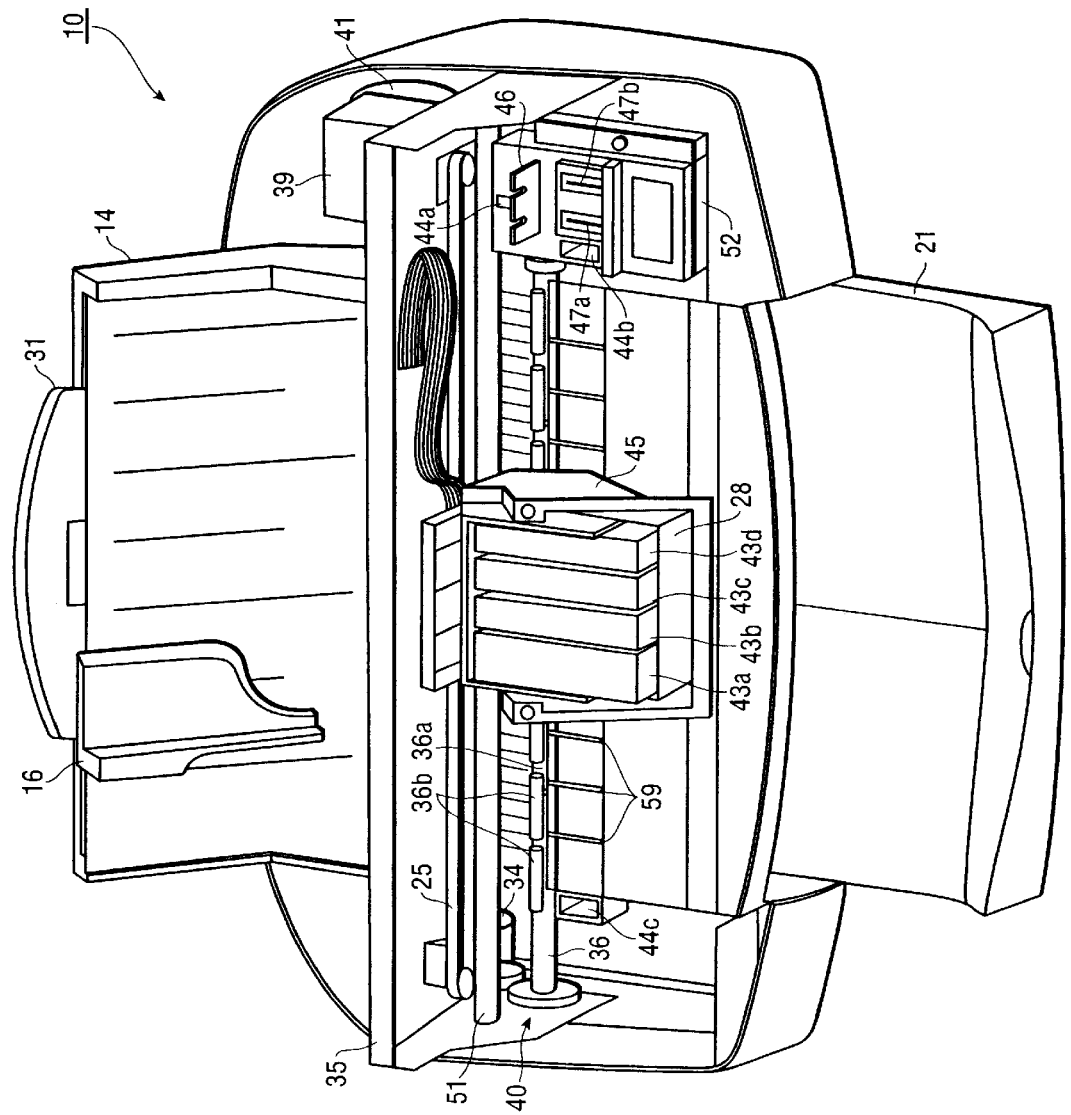
FIG. 5 is a front, cut-away perspective view of the printer shown in FIG. 1.

FIGS. 4 and 5 show back and front cut-away perspective views, respectively, of printer 10. As shown in FIG. 4, printer 10 includes an automatic sheet feed assembly (ASF) that comprises automatic sheet feeder 14, ASF rollers 32a, 32b and 32c attached to ASF shaft 38 for feeding media from automatic feeder 14. ASF shaft 38 is driven by drive train assembly 42. Drive train assembly 42 is made up of a series of gears that are connected to and driven by ASF motor 41. Drive train assembly 42 is described in more detail below with reference to FIGS. 6A and 6B. ASF motor 41 is preferably a stepper motor that rotates in stepped increments (pulses). Utilization of a stepper motor provides the ability for a controller incorporated in circuit board 35 to count the number of steps the motor rotates each time the ASF is actuated. As such, the position of the ASF rollers at any instant can be determined by the controller. ASF shaft 38 also includes an ASF initialization sensor tab 37a. When the ASF shaft is positioned at a home position (initialization position), tab 37a is positioned between ASF initialization sensors 37b. Sensors 37b are light beam sensors, where one is a transmitter and the other a receiver such that when tab 37a is positioned between sensors 37b, tab 37a breaks continuity of the light beam, thereby indicating that the ASF is at the home position.

Also shown in FIG. 4 is a page edge (PE) detector lever 58a and PE sensors 58b. PE sensors 58b are similar to ASF initialization sensors 37b. That is, they are light beam sensors. PE lever 58a is pivotally mounted and is actuated by a sheet of the recording medium being fed through the printer 10. When no recording medium is being fed through printer 10, lever 58a is at a home position and breaks continuity of the light beam between sensors 58b. As a sheet of the recording medium begins to be fed through the printer by the ASF rollers, the leading edge of the recording medium engages PE lever 58a pivotally moving the lever to allow continuity of the light beam to be established between sensors 58b. Lever 58a remains in this position while the recording medium is being fed through printer 10 until the trailing edge of the recording medium reaches PE lever 58a, thereby disengaging lever 58a from the recording medium and allowing lever 58a to return to its home position to break the light beam. The PE sensor is utilized in this manner to sense when a page of the recording medium is being fed through the printer and the sensors provide feedback of such to a controller on circuit board 35.

Figure 6A:
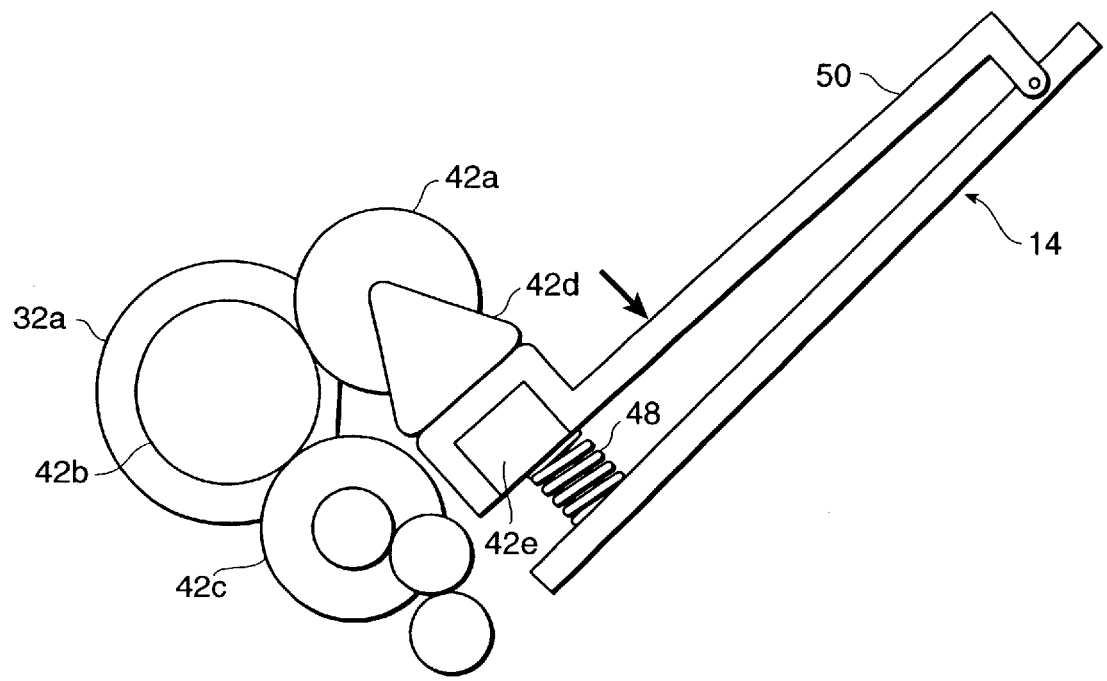
FIGS. 6A and 6B show a geartrain configuration for an automatic sheet feeder of the printer shown in FIG. 1.
Figure 6B:
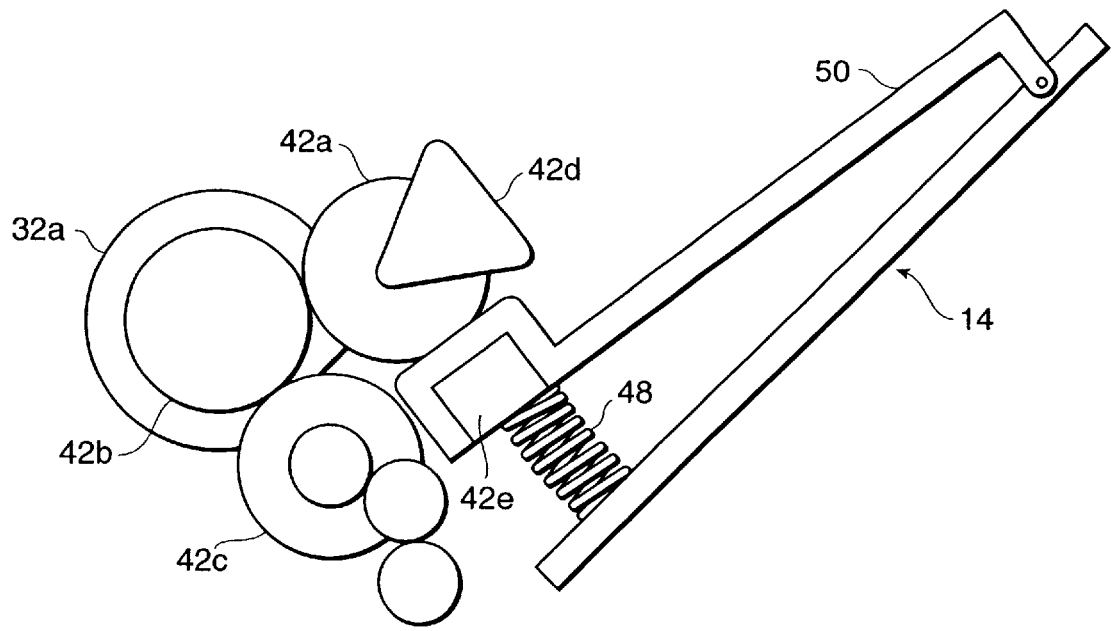

ASF gear train assembly 42 may appear as shown in FIGS. 6A and 6B. As shown in FIG. 6A, gear train assembly 42 comprises gears 42a, 42b and 42c. Gear 42b is attached to the end of ASF shaft 38 and turns the shaft when ASF motor 41 is engaged. Gear 42a engages gear. 42b and includes a cam 42d that engages an ASF tray detent arm 42e of automatic feeder 14. As shown in FIG. 6A, when ASF shaft 38 is positioned at the home position, cam 42d presses against detent arm 42e. Automatic feeder 14 includes a pivotally mounted plate 50 that is biased by spring 48 so that when cam 42d engages detent arm 42e, automatic feeder 14 is depressed and when cam 42d disengages detent arm 42e (such as that shown in FIG. 6B), plate 50 is released. Depressing detent arm 42e causes the recording media stacked in automatic feeder 14 to move away from ASF rollers 32a, 32b and 32c and releasing detent arm 42e allows the recording to move close to the rollers so that the rollers can engage the recording medium when the ASF motor is engaged.

Returning to FIG. 4, printer 10 includes line feed motor 34 that is utilized for feeding the recording medium through printer 10 during printing operations. Line feed motor 34 drives line feed shaft 36, which includes line feed pinch rollers 36a, via line feed geartrain 40. The geartrain ratio for line feed geartrain 40 is set to advance the recording medium a set amount for each pulse of line feed motor 34. The ratio may be set so that one pulse of line feed motor 34 results in a line feed amount of the recording medium equal to a one pixel resolution advancement of the recording medium. That is, if one pixel resolution of the printout of printer 10 is 600 dpi (dots per inch), the geartrain ratio may be set so that one pulse of line feed motor 34 results in a 600 dpi advancement of the recording medium. Alternatively, the ratio may be set so that each pulse of the motor results in a line feed amount that is equal to a fractional portion of one pixel resolution rather than being a one-to-one ratio. Line feed motor 34 preferably comprises a 200-step, 2 phase pulse motor and is controlled in response to signal commands received from circuit board 35. Of course, line feed motor 34 is not limited to a 200-step 2 phase pulse motor and any other type of line feed motor could be employed, including a DC motor with an encoder.

As shown in FIG. 5, printer 10 is a single cartridge printer which prints images using dual print heads, one having nozzles for printing black ink and the other having nozzles for printing cyan, magenta and yellow inks. Specifically, carriage 45 holds cartridge 28 that preferably accommodates ink tanks 43a, 43b, 43c and 43d, each containing a different colored ink. A more detailed description of cartridge 28 and ink tanks 43a to 43d is provided below with regard to FIG. 7. Carriage 45 is driven by carriage motor 39 in response to signal commands received from circuit board 35. Specifically, carriage motor 39 controls the motion of belt 25, which in turn provides for horizontal translation of carriage 45 along carriage guide shaft 51. In this regard, carriage motor 39 provides for bi-directional motion of belt 25, and thus of carriage 45. By virtue of this feature, printer 10 is able to perform bi-directional printing, i.e. print images from both left to right and right to left.

Printer 10 preferably includes recording medium cockling ribs 59. Ribs 59 induce a desired cockling pattern into the recording medium which the printer can compensate for by adjusting the firing frequency of the print head nozzles. Ribs 59 are spaced a set distance apart, depending upon the desired cockling shape. The distance between ribs 59 may be based on motor pulses of carriage motor 39. That is, ribs 59 may be positioned according to how many motor pulses of carriage motor 39 it takes for the print head to reach the location. For example, ribs 59 may be spaced in 132 pulse increments.

Printer 10 also preferably includes pre-fire receptacle areas 44a, 44b and 44c, wiper blade 46, and print head caps 47a and 47b. Receptacles 44a and 44b are located at a home position of carriage 45 and receptacle 44c is located outside of a printable area and opposite the home position. At desired times during printing operations, a print head pre-fire operation may be performed to eject a small amount of ink from the print heads into receptacles 44a, 44b and 44c. Wiper blade 46 is actuated to move with a forward and backward motion relative to the printer. When carriage 45 is moved to its home position, wiper blade 46 is actuated to move forward and aft so as to traverse across each of the print heads of cartridge 28, thereby wiping excess ink from the print heads. Print head caps 47a and 47b are actuated in a relative up and down motion to engage and disengage the print heads when carriage 45 is at its home position. Caps 47a and 47b are actuated by ASF motor 41 via a geartrain (not shown). Caps 47a and 47b are connected to a rotary pump 52 via tubes (not shown). Pump 52 is connected to line feed shaft 36 via a geartrain (not shown) and is actuated by running line feed motor 34 in a reverse direction. When caps 47a and 47b are actuated to engage the print heads, they form an airtight seal such that suction applied by pump 52 through the tubes and caps 47a and 47b sucks ink from the print head nozzles through the tubes and into a waste ink container (not shown). Caps 47a and 47b also protect the nozzles of the print heads from dust, dirt and debris.

Figure 7:
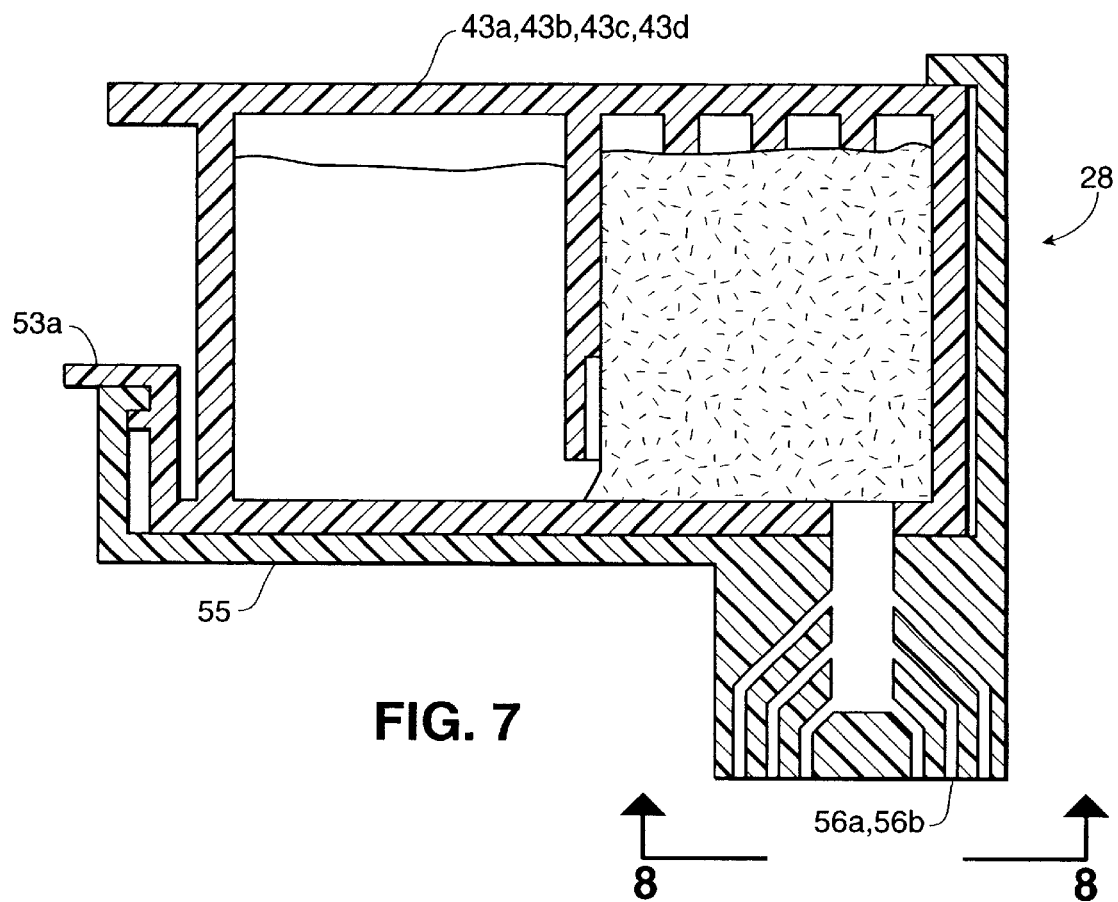
FIG. 7 is a cross-section view through a print cartridge and ink tank of the printer of FIG. 1.

FIG. 7 is a cross section view through one of the ink tanks installed in cartridge 28. Ink cartridge 28 includes cartridge housing 55, print heads 56a and 56b, and ink tanks 43a, 43b, 43c and 43d. Cartridge body 28 accommodates ink tanks 43a to 43d and includes ink flow paths for feeding ink from each of the ink tanks to either of print heads 56a or 56b. Ink tanks 43a to 43d are removable from cartridge 28 and store ink used by printer 10 to print images. Specifically, ink tanks 43a to 43d are inserted within cartridge 28 and can be removed by actuating retention tabs 53a to 53d, respectively. Ink tanks 43a to 43d can store color (e.g., cyan, magenta and yellow) ink and/or black ink. The structure of ink tanks 43a to 43b may be similar to that described in U.S. Pat. No. 5,509,140, or may be any other type of ink tank that can be installed in cartridge 28 to supply ink to print heads 56a and 56b.

Figure 8:
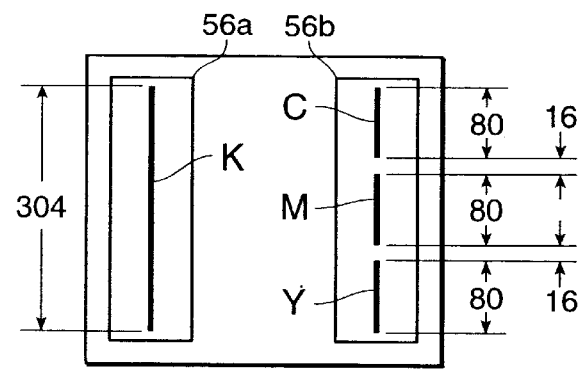
FIG. 8 is a plan view of a print head and nozzle configuration of the print cartridge of FIG. 7.

FIG. 8 depicts a nozzle configuration for each of print heads 56a and 56b. In FIG. 8, print head 56a is for printing black ink and print head 56b is for printing color ink. Print head 56a preferably includes 304 nozzles at a 600 dpi pitch spacing. Print head 56b preferably includes 80 nozzles at a 600 dpi pitch for printing cyan ink, 80 nozzles at a 600 dpi pitch for printing magenta ink, and 80 nozzles at a 600 dpi pitch for printing yellow ink. An empty space is provided between each set of nozzles in print head 56b corresponding to 16 nozzles spaced at a 600 dpi pitch. Each of print heads 56a and 56b eject ink based on commands received from a controller on circuit board 35.

Figure 9:
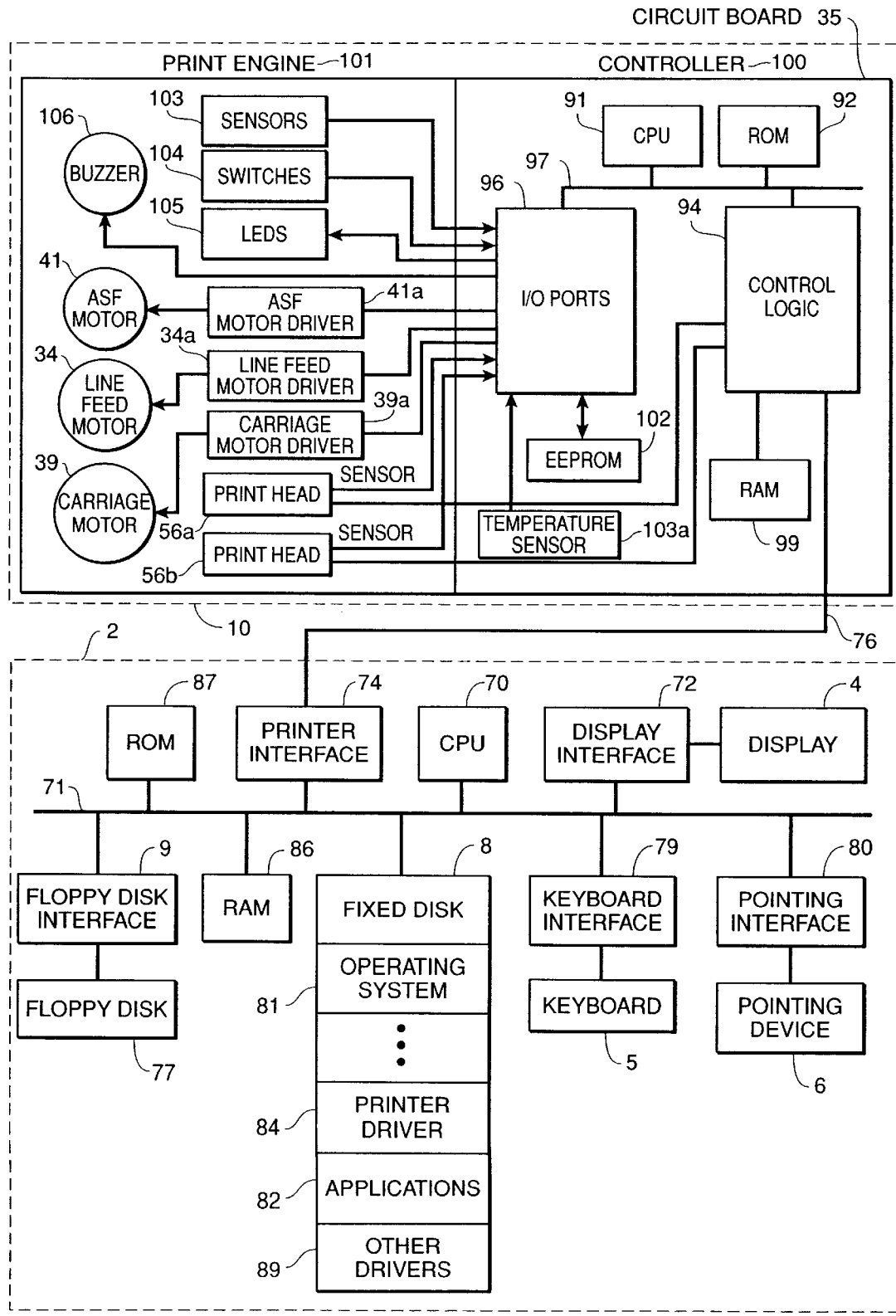
FIG. 9 is a block diagram showing the hardware configuration of a host processor interfaced to the printer of the present invention.

FIG. 9 is a block diagram showing the internal structures of host processor 2 and printer 10. In FIG. 9, host processor 2 includes a central processing unit 70 such as a programmable microprocessor interfaced to computer bus 71. Also coupled to computer bus 71 are display interface 72 for interfacing to display 4, printer interface 74 for interfacing to printer 10 through bi-directional communication line 76, floppy disk interface 9 for interfacing to floppy disk 77, keyboard interface 79 for interfacing to keyboard 5, and pointing device interface 80 for interfacing to pointing device 6. Disk 8 includes an operating system section for storing operating system 81, an applications section for storing applications 82, and a printer driver section for storing printer driver 84.

A random access main memory (hereinafter "RAM") 86 interfaces to computer bus 71 to provide CPU 70 with access to memory storage. In particular, when executing stored application program instruction sequences such as those associated with application programs stored in applications section 82 of disk 8, CPU 70 loads those application instruction sequences from disk 8 (or other storage media such as media accessed via a network or floppy disk interface 9) into random access memory (hereinafter "RAM") 86 and executes those stored program instruction sequences out of RAM 86. RAM 86 provides for a print data buffer used by printer driver 84. It should also be recognized that standard disk-swapping techniques available under the windowing operating system allow segments of memory, including the aforementioned print data buffer, to be swapped on and off of disk 8. Read only memory (hereinafter "ROM") 87 in host processor 2 stores invariant instruction sequences, such as start-up instruction sequences or basic input/output operating system (BIOS) sequences for operation of keyboard 5.

As shown in FIG. 9, and as previously mentioned, disk 8 stores program instruction sequences for a windowing operating system and for various application programs such as graphics application programs, drawing application programs, desktop publishing application programs, and the like. In addition, disk 8 also stores color image files such as might be displayed by display 4 or printed by printer 10 under control of a designated application program. Disk 8 also stores a color monitor driver in other drivers section 89 which controls how multi-level RGB color primary values are provided to display interface 72. Printer driver 84 controls printer 10 for both black and color printing and supplies print data for print out according to the configuration of printer 10. Print data is transferred to printer 10, and control signals are exchanged between host processor 2 and printer 10, through printer interface 74 connected to line 76 under control of printer driver 84. Printer interface 74 and line 76 may be, for example an IEEE 1284 parallel port and cable or a universal serial bus port and cable. Other device drivers are also stored on disk 8, for providing appropriate signals to various devices, such as network devices, facsimile devices, and the like, connected to host processor 2.

Ordinarily, application programs and drivers stored on disk 8 first need to be installed by the user onto disk 8 from other computer-readable media on which those programs and drivers are initially stored. For example, it is customary for a user to purchase a floppy disk, or other computer-readable media such as CD-ROM, on which a copy of a printer driver is stored. The user would then install the printer driver onto disk 8 through well-known techniques by which the printer driver is copied onto disk 8. At the same time, it is also possible for the user, via a modem interface (not shown) or via a network (not shown), to download a printer driver, such as by downloading from a file server or from a computerized bulletin board.

Referring again to FIG. 9, printer 10 includes a circuit board 35 which essentially contain two sections, controller 100 and print engine 101. Controller 100 includes CPU 91 such as an 8-bit or a 16-bit microprocessor including programmable timer and interrupt controller, ROM 92, control logic 94, and I/O ports unit 96 connected to bus 97. Also connected to control logic 94 is RAM 99. Control logic 94 includes controllers for line feed motor 34, for print image buffer storage in RAM 99, for heat pulse generation, and for head data. Control logic 94 also provides control signals for nozzles in print heads 56a and 56b of print engine 101, carriage motor 39, ASF motor 41, line feed motor 34, and print data for print heads 56a and 56b. EEPROM 102 is connected to I/O ports unit 96 to provide non-volatile memory for printer information and also stores parameters that identify the printer, the driver, the print heads, the status of ink in the cartridges, etc., which are sent to printer driver 84 of host processor 2 to inform host processor 2 of the operational parameters of printer 10.

I/O ports unit 96 is coupled to print engine 101 in which a pair of print heads 56a and 56b perform recording on a recording medium by scanning across the recording medium while printing using print data from a print buffer in RAM 99. Control logic 94 is also coupled to printer interface 74 of host processor 2 via communication line 76 for exchange of control signals and to receive print data and print data addresses. ROM 92 stores font data, program instruction sequences used to control printer 10, and other invariant data for printer operation. RAM 99 stores print data in a print buffer defined by printer driver 84 for print heads 56a and 56b and other information for printer operation.

Sensors, generally indicated as 103, are arranged in print engine 101 to detect printer status and to measure temperature and other quantities that affect printing. A photo sensor (e.g., an automatic alignment sensor) measures print density and dot locations for automatic alignment. Sensors 103 are also arranged in print engine 101 to detect other conditions such as the open or closed status of access door 12, presence of recording media, etc. In addition, diode sensors, including a thermistor, are located in print heads 56a and 56b to measure print head temperature, which is transmitted to I/O ports unit 96.

I/O ports unit 96 also receives input from switches 104 such as power button 26 and resume button 24 and delivers control signals to LEDs 105 to light indicator light 23, to line feed motor 34 ASF motor 41 and carriage motor 39 through line feed motor driver 34a, ASF motor driver 41a and carriage motor driver 39a, respectively.

Although FIG. 9 shows individual components of printer 10 as separate and distinct from one another, it is preferable that some of the components be combined. For example, control logic 94 may be combined with I/O ports 96 in an ASIC to simplify interconnections for the functions of printer 10.

Figure 10:
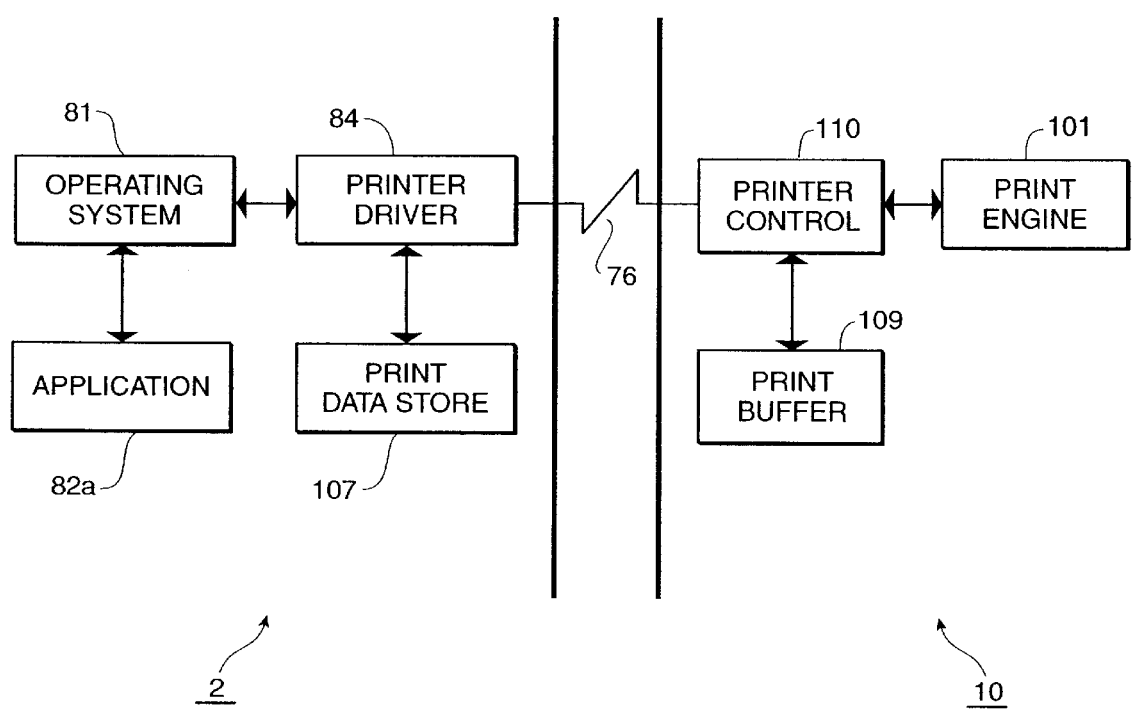
FIG. 10 shows a functional block diagram of the host processor and printer shown in FIG. 8.

FIG. 10 shows a high-level functional block diagram that illustrates the interaction between host processor 2 and printer 10. As illustrated in FIG. 10, when a print instruction is issued from image processing application program 82a stored in application section 82 of disk 8, operating system 81 issues graphics device interface calls to printer driver 84. Printer driver 84 responds by generating print data corresponding to the print instruction and stores the print data in print data store 107. Print data store 107 may reside in RAM 86 or in disk 8, or through disk swapping operations of operating system 81 may initially be stored in RAM 86 and swapped in and out of disk 8. Thereafter, printer driver 84 obtains print data from print data store 107 and transmits the print data through printer interface 74, to bi-directional communication line 76, and to print buffer 109 through printer control 110. Print buffer 109 resides in RAM 99, and printer control 110 resides in firmware implemented through control logic 94 and CPU 91 of FIG. 9. Printer control 110 processes the print data in print buffer 109 responsive to commands received from host processor 2 and performs printing tasks under control of instructions stored in ROM 92 (see FIG. 9) to provide appropriate print head and other control signals to print engine 101 for recording images onto recording media.

Print buffer 109 has a first section for storing print data to be printed by one of print heads 56a and 56b, and a second section for storing print data to be printed by the other one of print heads 56a and 56b. Each print buffer section has storage locations corresponding to the number of print positions of the associated print head. These storage locations are defined by printer driver 84 according to a resolution selected for printing. Each print buffer section also includes additional storage locations for transfer of print data during ramp-up of print heads 56a and 56b to printing speed. Print data is transferred from print data store 107 in host processor 2 to storage locations of print buffer 109 that are addressed by printer driver 84. As a result, print data for a next scan may be inserted into vacant storage locations in print buffer 109 both during ramp up and during printing of a current scan.

Figure 11:
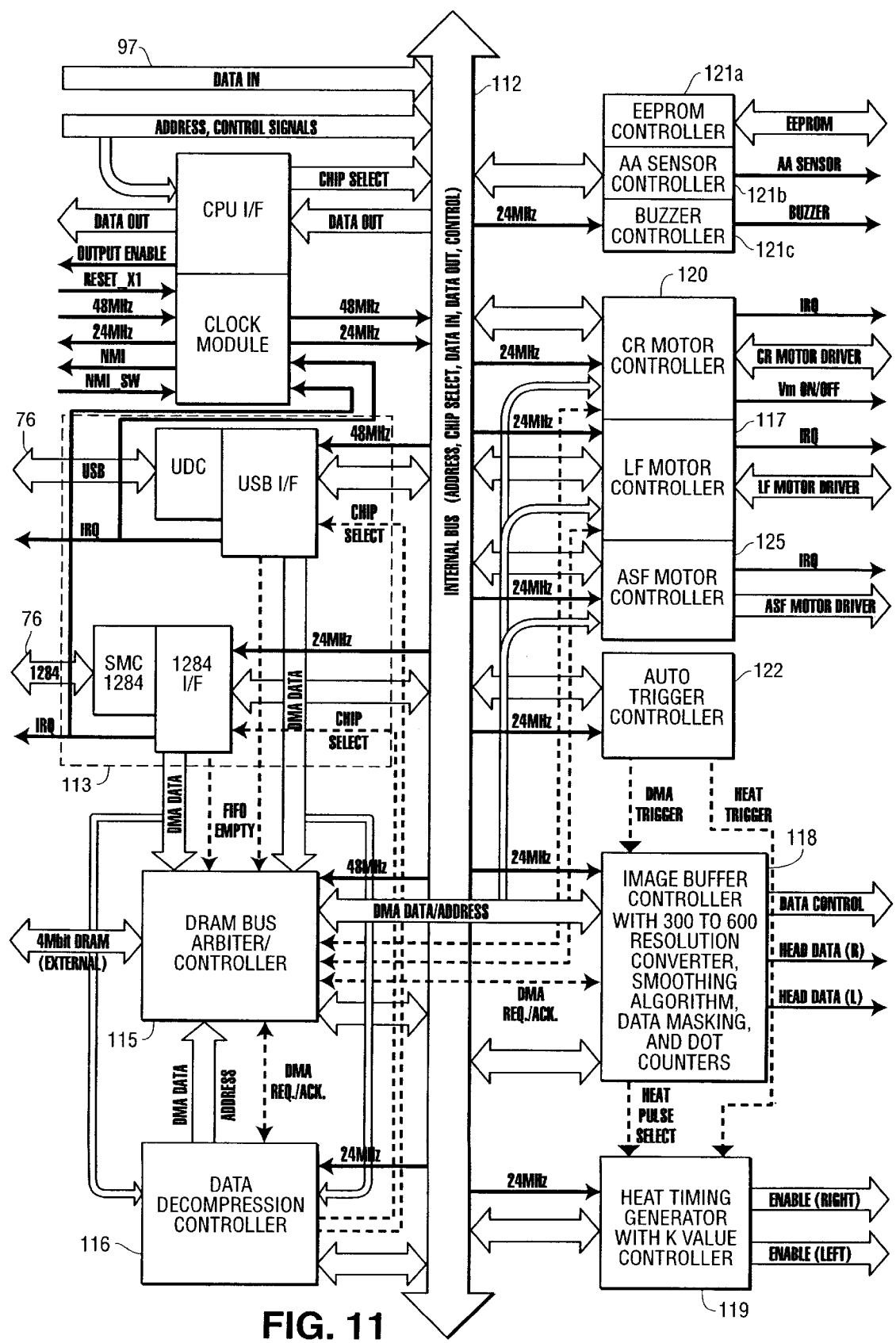
FIG. 11 is a block diagram showing the internal configuration of the gate array shown in FIG. 9.

FIG. 11 depicts a block diagram of a combined configuration for control logic 94 and I/O ports unit 96, which as mentioned above, I/O ports unit 96 may be included within control logic 94. In FIG. 11, internal bus 112 is connected to printer bus 97 for communication with printer CPU 91. Bus 112 is coupled to host computer interface 113 (shown in dashed lines) which is connected to bi-directional line 76 for carrying out bi-directional communication. As shown in FIG. 11, bi-directional line 76 may be either an IEEE-1284 line or a USB line. Bi-directional communication line 76 is also coupled to printer interface 74 of host processor 2. Host computer interface 113 includes both IEEE-1284 and USB interfaces, both of which are connected to bus 112 and to DRAM bus arbiter/controller 115 for controlling RAM 99 which includes print buffer 109 (see FIGS. 9 and 10). Data decompressor 116 is connected to bus 112, DRAM bus arbiter/controller 115 and each of the IEEE-1284 and USB interfaces of host computer interface 113 to decompress print data when processing. Also coupled to bus 112 are line feed motor controller 117 that is connected to line feed motor driver 34a of FIG. 9, image buffer controller 118 which provides serial control signals and head data signals for each of print heads 56a and 56b, heat timing generator 119 which provides block control signals and analog heat pulses for each of print heads 56a and 56b, carriage motor controller 120 that is connected to carriage motor driver 39a of FIG. 9, and ASF motor controller 125 that is connected to ASF motor driver 41a of FIG. 9. Additionally, EEPROM controller 121a, automatic alignment sensor controller 121b and buzzer controller 121 are connected to bus 112 for controlling EEPROM 102, an automatic alignment sensor (generally represented within sensors 103 of FIG. 9), and buzzer 106. Further, auto trigger controller 122 is connected to bus 112 and provides signals to image buffer controller 118 and heat timing generator 119, for controlling the firing of the nozzles of print heads 56a and 56b.

Control logic 94 operates to receive commands from host processor 2 for use in CPU 91, and to send printer status and other response signals to host processor 2 through host computer interface 113 and bi-directional communication line 76. Print data and print buffer memory addresses for print data received from host processor 2 are sent to print buffer 109 in RAM 99 via DRAM bus arbiter/controller 115, and the addressed print data from print buffer 109 is transferred through controller 115 to print engine 101 for printing by print heads 56a and 56b. In this regard, heat timing generator 119 generates analog heat pulses required for printing the print data.

Figure 12:
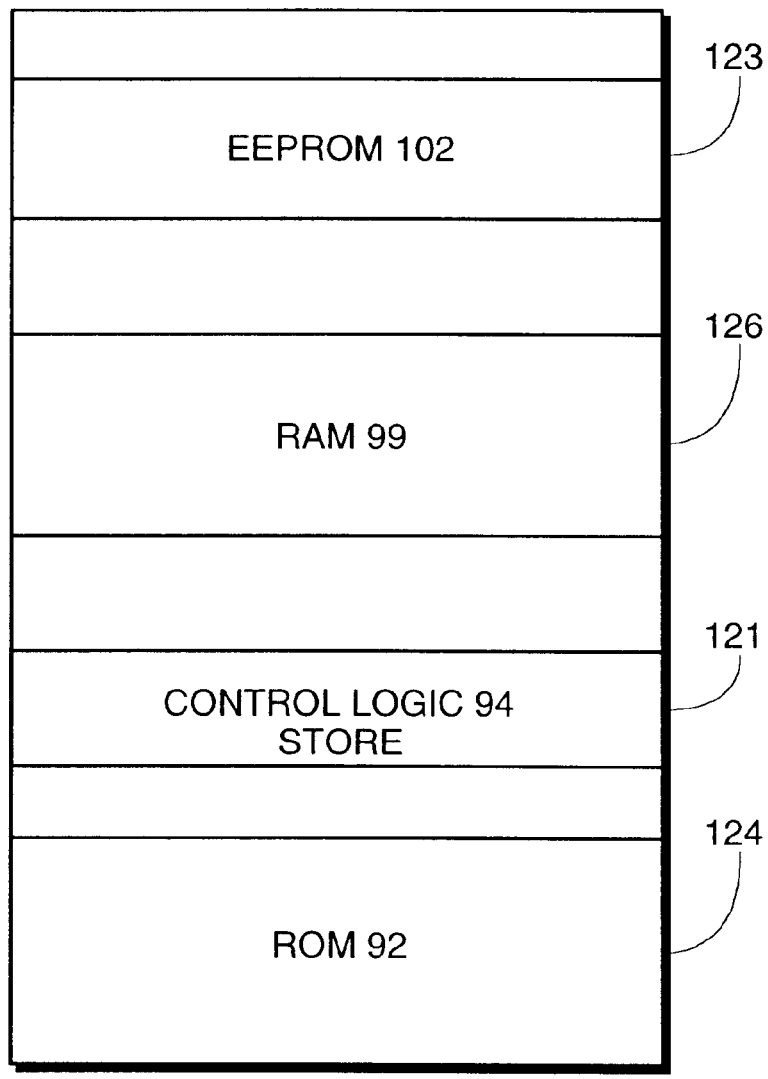
FIG. 12 shows the memory architecture of the printer of the present invention.

FIG. 12 shows the memory architecture for printer 10. As shown in FIG. 11, EEPROM 102, RAM 99, ROM 92 and temporary storage 121 for control logic 94 form a memory structure with a single addressing arrangement. Referring to FIG. 11, EEPROM 102, shown as non-volatile memory section 123, stores a set of parameters that are used by host processor 2 and that identify printer and print heads, print head status, print head alignment, and other print head characteristics. EEPROM 102 also stores another set of parameters, such as clean time, auto-alignment sensor data, etc., which are used by printer 10. ROM 92, shown as memory section 124, stores information for printer operation that is invariant, such as program sequences for printer tasks and print head operation temperature tables that are used to control the generation of nozzle heat pulses, etc. A random access memory section 121 stores temporary operational information for control logic 94, and memory section 126 corresponding to RAM 99 includes storage for variable operational data for printer tasks and print buffer 109.

Returning again to FIG. 9, fixed disk 8 may also store color image files such as might be displayed by display 4 or printed by printer 10 under control of specific application programs. Such color image files, which might also be generated dynamically during the execution of application programs, store or encode color image data for each pixel of a color image. One popular storage or encoding format is storage of a red, green and blue (RGB) color primary value for each pixel of the color image, with each of the R, G and B components being represented by an 8-bit byte. A resulting color image stored or encoded in this format provides the ability to represent each pixel of a color image by any one of $2^8 \times 2^8 \times 2^8 = 16.7$ million different colors. Such a format is sometimes called "true color" or "24-bit color". To print such an image, each pixel of the image is generally converted to a value for each of four primaries, such as cyan, magenta, yellow and black (CMYK). However, at each pixel, printer 10 can only print one density gradation (in the case of a binary printer) or a few density gradations (in the case of a multi-gradation printer), for each of the C, M, Y and K color planes. One purpose of halftoning according to the invention is to convert the multi-level image data stored in computer 2 into appropriate output values for printer 10.

Figure 13:
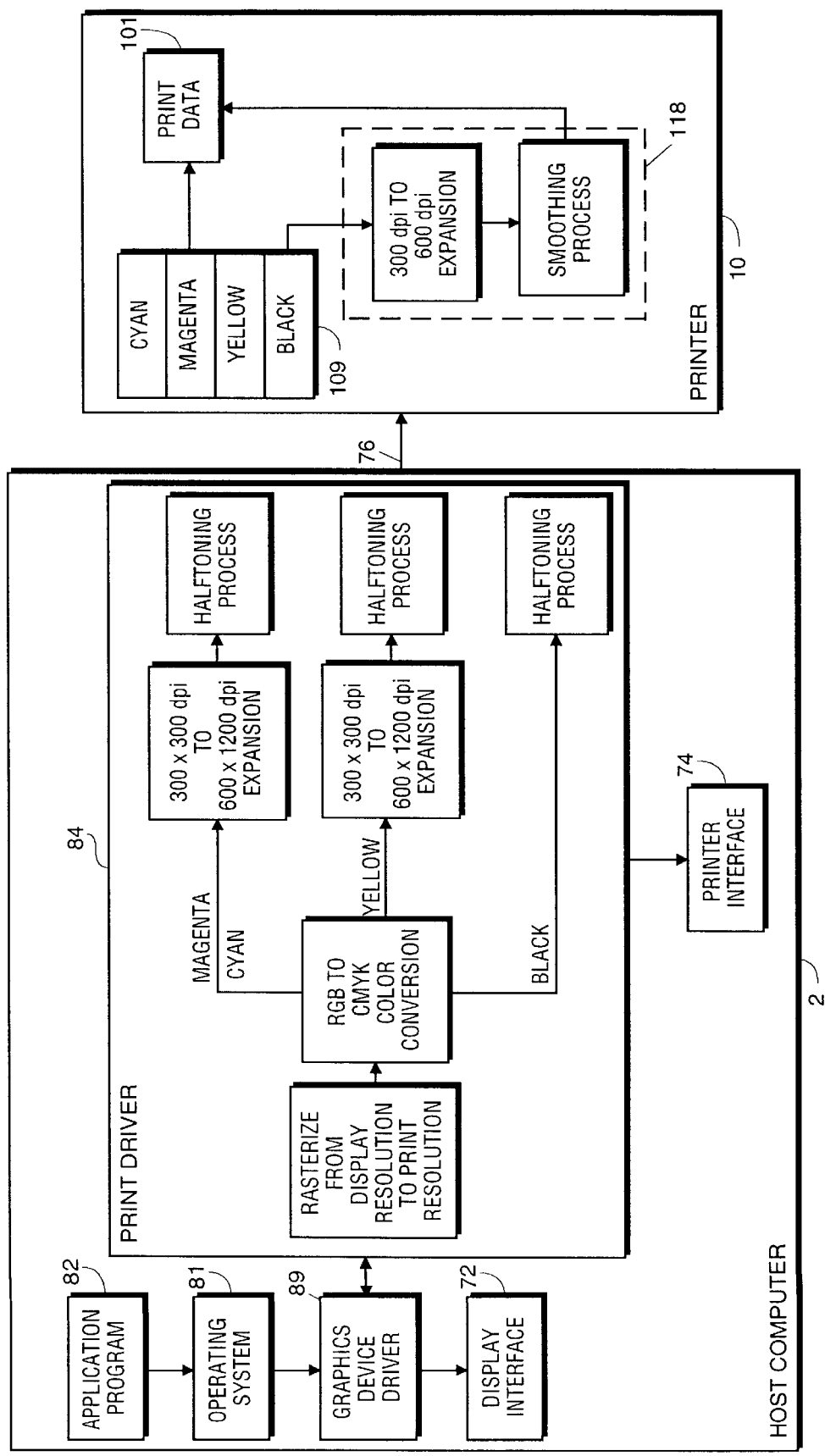
FIG. 13 shows an architecture depicting interaction between various components of FIG. 9 for performing halftoning according to the invention.

FIG. 13 depicts an architecture for performing multi-resolution halftoning and printing an image according to the invention. As stated above, an application program may be utilized to dynamically generate an image to be printed by printer 10. The application program may be contained in applications section 82 of fixed disk 8. Alternatively, an image file may be saved on fixed disk 8 or floppy disk 77 with an application program opening the file for viewing on display 4. As shown in FIG. 13, the application program interacts with operating system 81 and graphics device driver 89 to display the image through display interface 72 onto display 4. When a print request is made in the application program, and print driver 84 is activated. The print driver presents the user with various print options, including a print mode. Various print modes may be included, such as a standard mode, a draft mode or a high resolution mode. Draft mode generally provides for faster printing, but low quality, standard mode generally provides for fast printing with enhanced quality, and high resolution mode generally provides for slower printing speed with high quality. FIG. 13 depicts a print driver performing processing in the standard mode.

As seen in FIG. 13, print driver 84 interacts with graphics device driver 89. Print driver 84 obtains color values (RGB) for each pixel displayed on display 4 from graphics device driver 89 and performs a rasterization process to expand the image data from a display resolution (typically 72 dpi) into a printer resolution and to form a rasterized image in the print resolution. As will be discussed below, the rasterization may be performed in either a low (300 dpi) or high (600 dpi) resolution. Printer driver 84 then performs other processes, as will be discussed in more detail below, to convert the RGB data into CMYK data for printing by printer 10. Print driver 84 then interacts with printer interface 74 to send the print data to printer 10 over bi-directional interface 76.

Printer 10 receives the print data and stores the data in print buffer 109. The print data is generally stored in respective memory blocks for each color of the print data, i.e. different memory blocks for each of the cyan, magenta, yellow and black print data. Printer 10 then process the print data through controller 100 and print engine 101 to print out an image.

Figure 14:
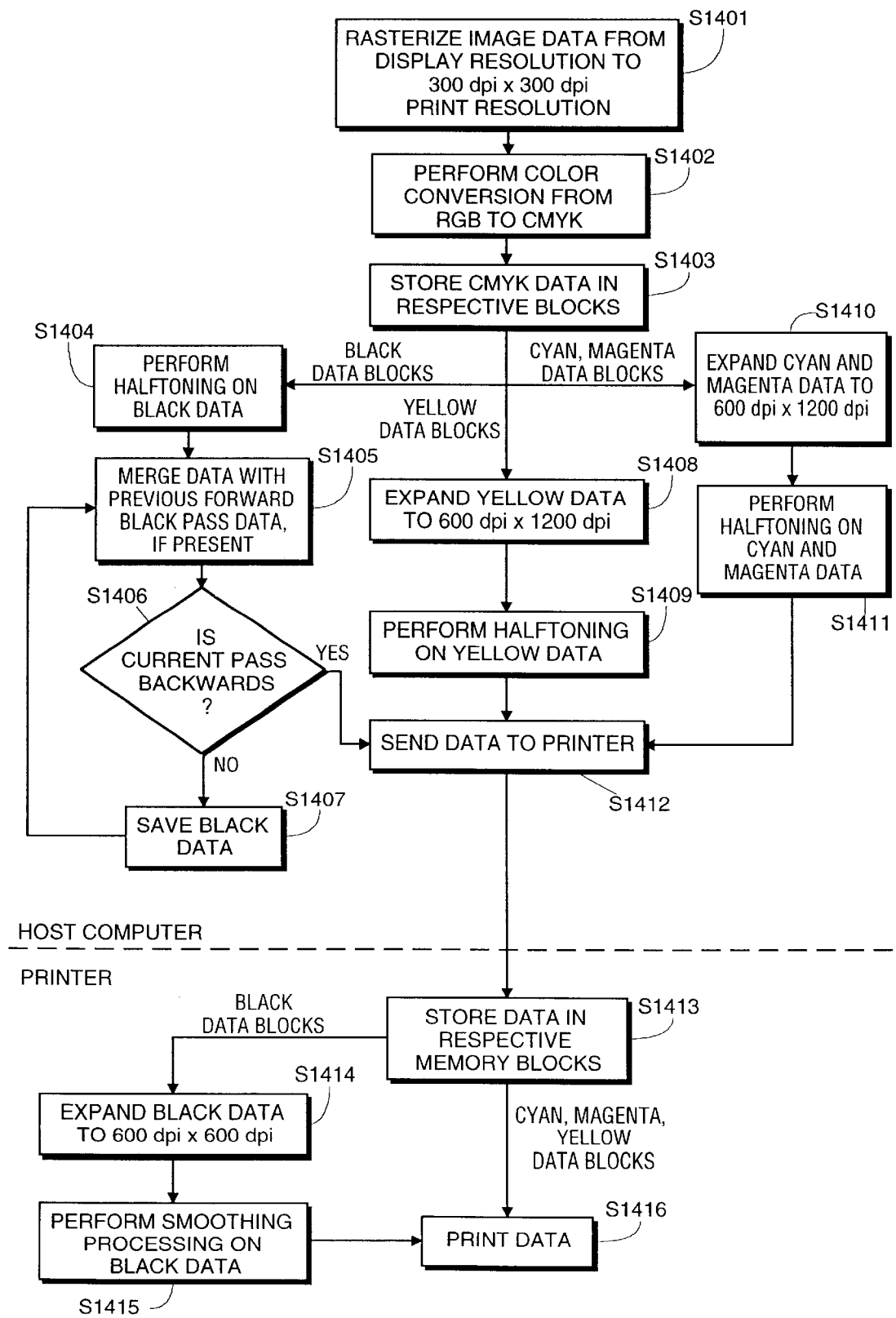
FIG. 14 is a flowchart of process steps for performing halftoning and printing according to the invention.

FIG. 14 is a flowchart of process steps for performing a multi-resolution halftoning process and printing data according to the invention. The multi-resolution halftoning process shown in FIG. 14 is preferably performed by print driver 84 in host computer 2. However, it should be recognized that the halftoning process is not required to be performed by print driver 84 in host computer 2 and may be performed in printer 10 instead. But since host computer 2 generally includes a greater amount of memory than printer 10 and a faster CPU speed, it is preferable that the process be performed in host computer 2 in order to reduce the image processing time.

The process is commenced by a user selecting a print option from an application program that activates the print driver and displays a print driver graphical user interface (GUI) on display 4. The print driver GUI generally displays default print settings such as a default print mode, generally a standard mode, and a default color print option, generally color. The GUI also provides a properties option button for the user to change the default settings. For instance, the user could change the print mode from standard to draft or high resolution and could change the color option from color to greyscale. Once the user has selected the print mode and set any other options, or if he merely opts for the default settings, he selects an OK option in the GUI to submit a print job to the printer. In FIG. 14, it is assumed that the print driver is performing processing for a standard print mode, although draft and high resolution would be performed similarly with adjustments being made for the print resolution.

Once the user selects the OK button to submit the print job to the printer, the print driver obtains image data from the device driver for the image being printed and performs a rasterization process (step S1401) to form a multi-value rasterized image of the image being printed. The device driver generally forms the displayed image in a display resolution, typically 72 dpi, and the rasterization process performs a process to expand the image data from the display resolution to a printer resolution. The printer resolution that the rasterization process expands the rasterized image to is based on the print resolution capabilities of the printer. In FIG. 14, it is assumed that the printer prints in 300, 600 and 1200 dpi resolutions. Of course, the halftoning process of FIG. 14 is not limited to 300, 600 and 1200 dpi resolutions and could be applied to other resolutions, such as 360, 720, 1440, etc.

It should also be noted that the rasterization process could be performed as either a low resolution rasterization process or a high resolution rasterization process. The high resolution rasterization process generally provides for good quality images, but increases the image processing time. One example of a high resolution rasterization process would be to convert the 72 dpi data to 600 dpi data. A low resolution rasterization process reduces the image processing time, but provides for a somewhat lower quality image. However, as will be discussed below, other processes may be performed on the low resolution rasterized image data to enhance the image quality. In the present example, the rasterization process produces a low resolution (300×300 dpi) rasterized image. Of course, other low resolutions, such as 360 dpi, could also be used and the invention is not limited to a 300 dpi rasterized image.

The rasterization process also extracts R, G and B values for each pixel to obtain a multi-level image (i.e. three layers of red, green and blue). Thus, the rasterized image is generated in terms of multi-value image data (RGB).

The print driver then performs a color conversion process (step S1402) to convert the multi-value RGB image data to CMYK (cyan, magenta, yellow and black) image data. CMYK data values correspond to the ink colors utilized in printing an image by the printer. The CMYK values obtained in the color conversion process are generally stored in memory blocks corresponding respectively to each of the colors (step S1403), i.e. separate memory blocks for each of the cyan, magenta, yellow and black data. Since the RGB data is 300 dpi resolution data, i.e. the rasterization process produced 300 dpi RGB data, the converted CMYK data stored in the memory blocks is also 300 dpi data.

The next process performed on the CMYK data is dependent upon the color of the data, i.e. which data block it is stored in. As seen in step S1404, black (K) data is subjected to a halftoning process. In this regard, the halftoning process may be any halftoning process known in the art. Additionally, the halftoning process may be similar to that described in co-pending U.S. application Ser. No. 09/019,310, entitled "Halftoning With Changeable Error Diffusion Weights", filed Feb. 5, 1998, the contents of which are incorporated by reference as if set forth in full herein.

It should be noted that the halftoning process is generally performed at the same resolution of the data input to the halftoning process. That is, if low resolution (300 dpi) data is input to the halftoning process, then the halftoning process is referred to as a low resolution halftoning process. On the other hand, if high resolution (600 or 1200 dpi) data is input to the halftoning process, then the halftoning process is generally referred to as a high resolution halftoning process. A low resolution halftoning process provides for faster image processing, but lower image quality. Likewise, a high resolution halftoning process somewhat reduces the image processing speed, but provides for much higher quality images. In step S1404, since the black data stored in the memory block is low resolution (300 dpi) data and this low resolution data is input to the halftoning process, the halftoning process for the black data is a low resolution process. Although the black image data is halftoned in low resolution, which generally produces a lower quality image, this is of little consequence for black data, which is generally text data that generally does not require a higher quality. However, as will be described below, higher quality text data can be achieved by additional processes performed in the printer. For instance, if additional image quality is desired for the black data, the black image data may be sent to the printer with commands for performing data expansion and smoothing processing on the black data. Thus, the low resolution halftoning process provides for faster image processing, and higher quality text can be achieved by further processing in the printer.

Before the black halftoned data is sent to the printer, some intermediate steps may be performed. In FIG. 14, these intermediate steps are operations specific to printing black data only in backward scans of the print head. Printing black data only in backward scans helps to reduce mixing of the black ink with color ink printed in a forward pass. Since these steps are specific to printing black data only in a backward pass, it can readily be recognized that steps S1405 to S1407 are not necessary to practice the invention and they can be omitted if desired. However, for purposes of the present discussion, in step S1405, the black image data of the current halftoning pass is merged with black data of the previous forward pass, if such data is present. Next, in step S1406, a determination is made whether the current pass is a backward pass. If it is, then the black print data is sent to the printer in step S1412. If the current pass is not a backward pass, i.e. it is a forward pass, then the black print data is saved (step S1407) and merged with the next pass and is sent to the printer in the next pass, if it is a backward pass.

The yellow data stored in step S1403 in a respective data block for the yellow data is subjected a different process then the black data. As seen in FIG. 14, in step S1408, the yellow data is subjected to an expansion process to expand the data from 300×300 dpi data to 600×1200 dpi data. Of course, the data could be expanded to other resolutions as well, such as 600×600 dpi, 720×720 dpi, etc., depending on the print resolution of the printer and a desired resolution of data to be sent to the printer.

After the data is expanded, it is subjected to a halftoning process in step S1409. The halftoning process may be the same type of halftoning process utilized for halftoning the black data, or any other halftoning process. Since the image data input to the halftoning process has been expanded from low resolution to high resolution, the halftoning process is a high resolution halftoning process. As such, a somewhat longer image processing time results, but the image quality is significantly enhanced. However, the additional processing time for the high resolution halftoning process is of little consequence to the overall image processing time, especially in light of faster CPU speeds currently available in the personal computer market. After the halftoning process, the high resolution halftoned yellow data is sent to the printer in step S1412.

The cyan and magenta image data is subjected a process similar to the yellow image data. That is, the cyan and magenta image data is expanded from 300×300 dpi resolution data to 600×1200 dpi resolution data. Again, the data could be expanded to any high resolution other than 600×1200 dpi. The expanded cyan and magenta data is then subjected to a halftoning process. Both the cyan and magenta data are subjected to the same halftoning process, together. In this regard, it has been found that subjecting the cyan and magenta data to the same halftoning process provides for a better quality image. However, the yellow image data can be halftoned in a separate halftoning process since the yellow color is much lighter than either the cyan or magenta colors. Of course, it is not required that the cyan and magenta data be halftoned in the same halftoning process and they could be subjected to separate halftoning processes. However, the combined halftoning process has been found to produce a higher quality image and therefore the combined process has been included in the present description. Once the high resolution cyan and magenta data has been halftoned, the data is sent to the printer in step S1412.

To summarize the foregoing, a low resolution rasterized image is formed by the print driver and color conversion is performed on the rasterized image to obtain CMYK values. The CMYK values are then subjected to different halftoning processes, the black being subjected to a low resolution halftoning process, and the yellow, cyan and magenta being subjected to a high resolution halftoning process. The low resolution halftoned black data and the high resolution color data is then sent to the printer.

Upon receiving the black, cyan, magenta and yellow image data, the printer stores the data in respective memory blocks in a print buffer. The print engine and controller in the printer then processes each of the respective memory blocks to print out the image. If commands were sent to the printer with the black data to perform expansion and smoothing processing, then these processes are performed in steps S1414 and S1415 and the black data is printed in step S1416. The expansion and smoothing processes may be performed in image buffer 118 (FIG. 9) and may constitute any data expansion and smoothing processing algorithm known in the art. The cyan, magenta and yellow data, which is high resolution data, is processed and printed by the printer in step S1416.

As a result of the foregoing, the image data is processed with multiple different resolutions in the print driver (black at low resolution and color at high resolution) and the black data is expanded and smoothed in the printer. The high resolution color image data provides for a good quality color image, and the low resolution, expanded to high resolution with smoothing processing, black image data provides good quality text with good quality in gradation areas.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. An image processing method comprising the steps of:
    rasterizing image data;
    determining whether the image data corresponds to black image data or color image data;
    performing a halftoning process of a first resolution on the black image data;
    performing a halftoning process of a second resolution on the color image data;
    transferring the halftoned black image data and the halftoned color image data to a printing device;
    the printing device receiving the black image data and the color image data;
    performing a smoothing process on the black image data; and
    outputting an image based on the black image data and the color image data received by the printing device.

2. A method according to claim 1, wherein the first resolution is a low resolution and the second resolution is a high resolution.

3. A method according to claim 1, further comprising the step of expanding the black image data, after the halftoning process, from the first resolution to a higher resolution.

4. A method according to claim 1, wherein the rasterization step, the determining step, the halftoning process on the black image data, the halftoning process on the color image data and the transferring step are performed by a print driver, and wherein the receiving step, the smoothing step and the outputting step are performed by the printing device.

5. A print driver for processing image data, comprising:
    performing rasterization of the image data;
    determining whether the image data corresponds to black image data or color image data;
    performing a halftoning process of a first resolution on the black image data;
    performing a halftoning process of a second resolution on the color image data; and
    transmitting the black image data and the color image data to a printing device, together with a command for smoothing-processing of the black image data.

6. Computer executable process steps for processing image data, comprising the steps of:
    performing rasterization of the image data;
    determining whether the image data corresponds to black image data or color image data;
    performing a halftoning process of a first resolution on the black image data;
    performing a halftoning process of a second resolution on the color image data; and
    transferring the halftoned black image data and the halftoned color image data to a printing device;
    the printing device receiving the black image data and the color image data;

performing a smoothing process on the black image data; and outputting an image based on the black image data and the color image data received by the printing device.

7. Computer executable process steps according to claim 6, wherein the first resolution is a low resolution and the second resolution is a high resolution.

8. Computer executable process steps according to claim 6 further comprising the step of expanding the black image data, after the halftoning process, from the first resolution to a higher resolution.

9. Computer executable process steps according to claim 6, wherein the rasterization step, the determining step, the halftoning process on the black image data, the halftoning process on the color image data and the transferring step are performed by a print driver, and wherein the receiving step, the smoothing step and the outputting step are performed by the printing device.

10. An apparatus for processing image data, comprising:

a memory for storing executable process steps for processing the image data, the executable process steps comprising: (a) performing rasterization of the image data, (b) determining whether the image data corresponds to black image data or color image data, (c) performing a halftoning process of a first resolution on the black image data, (d) performing a halftoning process of a second resolution on the color image data, and (e) transferring the black image data and the color image data, together with a command for smoothing-processing of the black image data, to a printing device; and a processor for executing the executable process steps.

11. An apparatus according to claim 10, wherein the first resolution is a low resolution and the second resolution is a high resolution.

12. A printing device, comprising:

a receiving device for receiving image data;

an image data processing device for processing the received image data to output an image based on the received image data; and an image output device for printing an image based on the received image data, wherein, the received image data comprises black image data of a first resolution, color image data of a second resolution, and a command for the printing device to perform a smoothing process on the black image data.

13. A printing device according to claim 12, wherein the first resolution is a low resolution and the second resolution is a high resolution.

14. A printing device according to claim 12, wherein the image data processing device performs a process to expand the black image data from the first resolution to a higher resolution.

15. A printing system, comprising:

an image processing device for processing image data, the image processing device comprising a memory for storing executable process steps for processing the image data and a processor for processing the executable process steps, the executable process steps comprising (a) performing rasterization of the image data, (b) determining whether the image data corresponds to black image data or color image data, (c) performing a halftoning process of a first resolution on the black image data, (d) performing a halftoning process of a second resolution on the color image data, and (e) transferring the black image data and the color image data to a printing device, together with a command for the printing device to perform smoothing-processing on the black image data; and a printing device for receiving the image data transferred by the image processing device and processing the image data to print an image based on the received image data and to perform a smoothing-process on the black image data.

16. A printing system according to claim 15, wherein the first resolution is a low resolution and the second resolution is a high resolution.

17. A printing system according to claim 15, wherein the printing device performs a process to expand the black image data from the first resolution to a higher resolution.

18. A printing system according to claim 15, wherein the printing device comprises a print head having nozzles for printing the black image data and nozzles for printing the color image data, wherein the nozzles for printing the black image data have a faster printing speed than the nozzles for printing the color image data.

19. A printing system according to claim 15, wherein process black ink is utilized for printing in grey-scale regions.

* * * * *